United States Patent [19]

Dannatt

[11] 4,330,916

[45] May 25, 1982

[54] ASSEMBLY TOOL

[75] Inventor: Hugh S. L. Dannatt, Bethel, Conn.

[73] Assignee: Pitney Bowes Inc., Stamford, Conn.

[21] Appl. No.: 199,174

[22] Filed: Oct. 22, 1980

[51] Int. Cl.[3] .......... B23P 19/04

[52] U.S. Cl. .......... 29/227

[58] Field of Search .......... 29/227, 226, 225

[56] References Cited

U.S. PATENT DOCUMENTS 2,734,262 2/1956 Briegel .......... 29/227

*Primary Examiner*—James L. Jones, Jr.

*Attorney, Agent, or Firm*—Melvin J. Scolnick; William D. Soltow, Jr.; Albert W. Scribner

[57] ABSTRACT

An assembly tool upon which a spring is secured for enabling the spring to be inserted within an orifice whose entrance diameter is smaller than the outside diameter of the spring is disclosed. The assembly tool includes (1) a mandrel consisting of a first and second section; (2) a securing device that locks one end portion of the spring to the mandrel as it is positioned upon the first section; and (3) a releasable locking device that is rotatably and slideably mounted upon the second section for securing the other end portion of the spring. Upon securing the ends of the spring in the securing device and the locking device, and rotating the locking device upon the second section of the mandrel, the outside diameter of the spring is reduced. The spring is then inserted within the orifice while it is secured to the mandrel, unlocked and thereby returned to its unwound position, and subsequently released from the mandrel.

3 Claims, 4 Drawing Figures

10
11
12
13
14
15
16
17
18
19
20
21
22
23
24
25

ASSEMBLY TOOL

BACKGROUND OF THE DISCLOSURE

1. Field of the Invention

This invention relates to an assembly tool, and more particularly to an assembly tool upon which a spring can be positioned, secured, reduced in diameter, and subsequently inserted within an orifice whose entrance diameter is smaller than the outside diameter of the spring.

2. Description of the Prior Art

In many instances when it is necessary to place a spring within an orifice the entrance to the orifice is too small. The basic approach to getting the spring within the orifice has been to somehow force the larger spring into the smaller orifice. This generally causes damage to the spring, leads to uneven distribution of the helics of the spring, disturbs members to be assembled, and sometimes destroys the spring's basic utility.

SUMMARY OF THE INVENTION

It is therefore an object of the present invention to provide an assembly tool upon which a spring can be positioned and reduced in diameter, such that the spring can be easily inserted within an orifice whose entrance diameter is smaller than the outside diameter of the spring.

It is a further object of this invention to provide an assembly tool for inserting a spring within an orifice whose entrance diameter is smaller than the outside diameter of the spring without causing any damage to the spring.

It is still a further object of the invention to provide in addition to all the objects listed above, an assembly tool that is efficient, easy to operate and relatively inexpensive to manufacture.

The foregoing objects and others are accomplished in accordance with the present invention by providing an assembly tool comprising a mandrel consisting of a first and second section, the first section having a larger outside diameter than the second section. A flange is located at the point where the first section meets the second section. Positioned at the end of the first section of the mandrel is a securing means that is used for locking one end portion of a spring to the mandrel as the spring is positioned upon the first section. A releaseable locking device is rotatably and slideably mounted upon the second section of the mandrel. The locking device is for securing the other end portion of the spring thereto. Upon securing the ends of the spring in the securing means and the locking device, and rotating the locking device upon the second section of the mandrel, the outside diameter of the spring is reduced as the spring is concurrently placed under tension. Reducing the outside diameter of the spring enables the spring to be inserted within an orifice whose entrance diameter is smaller than the outside diameter of the spring. The spring is then inserted within the orifice while it is secured to the mandrel, unlocked and thereby returned to its unwound position, and subsequently released from the mandrel to position it within the orifice.

BRIEF DESCRIPTION OF THE DRAWINGS

For a better understanding of the invention as well as other objects and further features thereof, reference is made to the following detailed disclosure of this invention taken in conjunction with the accompanying drawings wherein.

DESCRIPTION OF THE PREFERRED EMBODIMENT

Figures 1, 2, 3, 4:
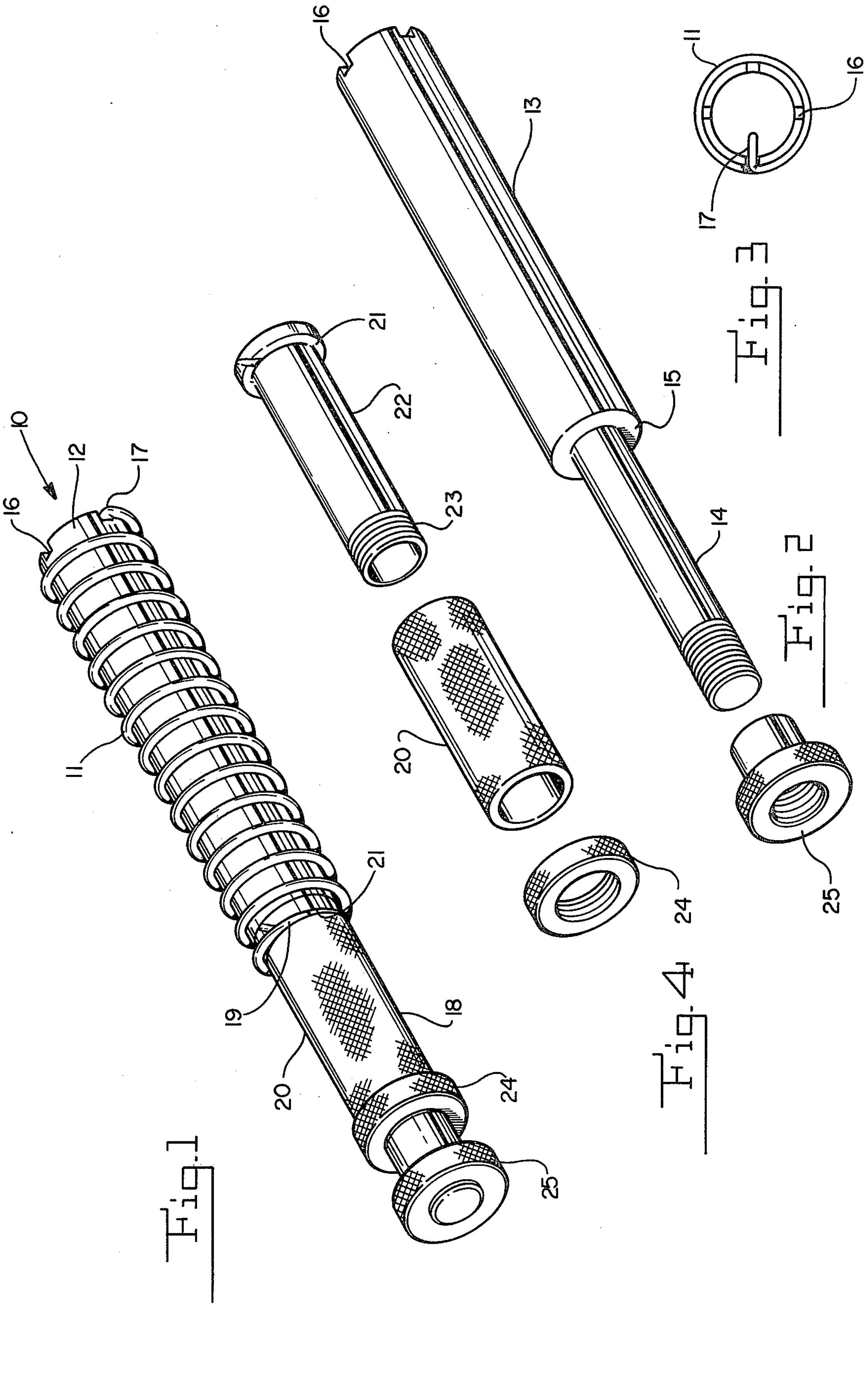
FIG. 1 is a perspective view of an assembly tool in accordance with the present invention including a spring positioned thereon.
FIG. 2 is a perspective view of an embodiment of a mandrel used with the assembly tool in accordance with the invention.
FIG. 3 is a right side plan view of the assembly tool with the spring positioned thereon as shown in FIG. 1.
FIG. 4 is a perspective view of the individual parts of a releasable locking device in accordance with the invention illustrating how the parts are assembled.

There is illustrated in FIG. 1 an assembly tool 10 in accordance with features of the present invention. Specifically, assembly tool 10 is shown with spring 11 secured thereto. The spring is illustrated as being tightly wound upon mandrel 12, and thus ready for insertion within an orifice whose entrance diameter is smaller than the outside diameter of the spring, i.e., when the spring it is in its normal, unwound position. The assembly tool comprises a mandrel 12 that includes a first and a second section. The mandrel is more clearly illustrated in FIG. 2 where it is shown as comprising a first section 13 and a second section 14, the first section having a larger outside diameter than the second section. Also shown is a flange 15 located at the position on the mandrel where the first section meets the second section thereof. Positioned at the end of first section 13 is a securing means for the purpose of locking one end portion of spring 11 when it is positioned upon the first section of the mandrel. The securing means is preferably in the form of a plurality of notches 16. As shown in FIGS. 1 and 3, when spring 11 is positioned upon the first section 13 of mandrel 12 the bent end portion 17 of spring 11 is placed within anyone of notches 16 for securing that end portion of spring 11 to the mandrel. Also illustrated in FIG. 1 is releasable locking device 18 that is rotatably and slideably mounted upon the second section 14 of the mandrel. The releasable locking device serves a dual function. First, it is used for securing the other end portion 19 of spring 11 between slidable collar 20 and flange 21. Second, once both end portions of spring 11 are secured, the releasable locking device can be rotated about the second section 14 of the mandrel. By this rotating action, the outside diameter of spring 11 is reduced as the spring is placed under tension. As shown in FIG. 4, releasable locking device 18 includes a hollow mandrel section 22 having threads 23 at one end portion thereof and flange 21 at its other end portion. Collar 20 is mounted upon mandrel 22. Threaded nut 24 is used to secure the collar upon mandrel 22 and thereby secure spring 11 in place between the collar and flange 21.

In operating assembly tool 10, one of the first steps is to temporarily tighten nut 24 so that releasable locking device 18 is restrained from freely rotating upon the second section 14 of mandrel 12. Spring 11 is placed on the first section 13 of mandrel 12 in a manner whereby the bent end portion 17 of the spring can be located within anyone of notches 16 to secure that end portion of the spring to mandrel 12. To secure the other end portion of spring 11, nut 24 is loosened to allow collar 20 of the releasable locking device to slide away from flange 21. Upon performing this operation, the other end portion 19 of spring 11 is placed in the space provided between flange 21 and slideable collar 20. Thereafter, nut 24 is tightened so that end portion 19 of the spring is secured within the releasable locking device. The next step is to loosen nut 25 that is mounted upon the end of the second section 14 of mandrel 12. This allows releasable locking device to move freely upon mandrel 12. With both ends of spring 11 secured in place, the releasable locking device is rotated either clockwise or counterclockwise until the outside diameter of the spring is reduced to basically the same as the outside diameter of the first section 13 of mandrel 12. Thereafter, nut 25 is tightened to secure the releasable locking device in place and prevent the spring from unwinding. In this reduced diameter state, the spring is now able to be inserted within an orifice whose entrance diameter is smaller than the outside diameter of the spring in its normal (unwound) position. After inserting the spring within the orifice, nut 24 is loosened. The spring then unwinds and separates from the releasable locking device. By then withdrawing the assembly tool from the orifice spring 11 will be left within its desired position.

While this invention has been described in conjunction with a specific embodiment thereof, it is evident that many alternatives, modifications and variations will be apparent to those skilled in the art. Accordingly, the present invention is intended to embrace all such alternatives, modifications and variations and fall within the spirit and scope of the amended claims.

I claim:

1. An assembly tool upon which a spring is secured for enabling the spring to be inserted within an orifice whose entrance diameter is smaller than the outside diameter of the spring, said tool comprising:

(i) a mandrel consisting of a first and a second section, said first section having a larger outside diameter then said second section and a flange located where said first section meets said second section;

(ii) securing means located at the end of said first section for locking one end portion of said spring as it is positioned upon said first section; and (iii) a releasable locking device rotatably and slideably mounted upon said second section for securing the other end portion of said spring, said locking device being slideable along said second section to said flange, whereby upon securing the ends of said spring in said securing means and said locking device, and rotating said locking device upon said second section, the outside diameter of said spring is reduced to thereby enable the spring to be inserted within said orifice while secured to said mandrel and then released from said mandrel to be positioned within said orifice.

2. An assembly tool according to claim 1 wherein said securing means comprises a plurality of notches into which one end portion of said spring can be positioned.

3. An assembly tool according to claim 1 further comprising a locking means for securing said releasable locking device to said mandrel and preventing it from any rotatable or slideable movement.

* * * * *